(12) United States Patent
Gabai et al.

(10) Patent No.: US 10,153,801 B2
(45) Date of Patent: Dec. 11, 2018

(54) SYSTEMS AND METHODS FOR ACOUSTIC COMMUNICATION IN A MOBILE DEVICE

(71) Applicant: WIZEDSP LTD., Tel-Aviv (IL)

(72) Inventors: Oz Gabai, Tel-Aviv (IL); Haim Primo, Ganey Tikva (IL)

(73) Assignee: WIZEDSP LTD., Tel-Aviv (IL)

( * ) Notice: Subject to any disclaimer, the term of this patent is extended or adjusted under 35 U.S.C. 154(b) by 0 days.

(21) Appl. No.: 15/323,439

(22) PCT Filed: Jul. 3, 2015

(86) PCT No.: PCT/IB2015/055011
§ 371 (c)(1),
(2) Date: Jan. 3, 2017

(87) PCT Pub. No.: WO2016/001879
PCT Pub. Date: Jan. 7, 2016

(65) Prior Publication Data
US 2017/0141811 A1    May 18, 2017

Related U.S. Application Data

(60) Provisional application No. 62/021,018, filed on Jul. 4, 2014.

(51) Int. Cl.
| | |
|---|---|
| *H04R 3/00* | (2006.01) |
| *H04B 1/401* | (2015.01) |
| *H04B 11/00* | (2006.01) |
| *H04W 4/00* | (2018.01) |
| *G10L 19/018* | (2013.01) |
| *G10L 21/0208* | (2013.01) |
| *H04M 1/725* | (2006.01) |
| *H04M 9/08* | (2006.01) |

(Continued)

(52) U.S. Cl.
CPC ............ *H04B 1/401* (2013.01); *G10L 19/018* (2013.01); *G10L 21/0208* (2013.01); *H04B 11/00* (2013.01); *H04M 1/72519* (2013.01); *H04M 9/08* (2013.01); *H04W 4/00* (2013.01); *H04W 4/70* (2018.02); *H04W 4/80* (2018.02)

(58) Field of Classification Search
USPC ... 381/26, 28, 71.11, 71.13, 91, 98, 99, 122; 455/41.3, 130, 127.4, 311, 553.1
See application file for complete search history.

(56) References Cited

U.S. PATENT DOCUMENTS

| | | | | |
|---|---|---|---|---|
| 8,264,392 B1 * | 9/2012 | Zarei | ...................... | H03M 3/47 |
| | | | | 341/155 |
| 2012/0171963 A1 * | 7/2012 | Tsfaty | .................... | H04B 11/00 |
| | | | | 455/41.3 |
| 2014/0362936 A1 * | 12/2014 | Tang | .................. | H04W 56/0015 |
| | | | | 375/267 |

* cited by examiner

*Primary Examiner* — Yosef K Laekemariam
(74) *Attorney, Agent, or Firm* — Alphapatent Associates, Ltd; Daniel J. Swirsky

(57) ABSTRACT

A communication device and method including a microphone, a first filter coupled to the microphone adapted to pass signals in an audio band only, a second filter coupled to the microphone adapted to pass signals only in an upper region of the audio band, an optional amplifier or two, an analog to digital converter (ADC) unit or two, an optional a switching unit connected between an input of the ADC unit and an output of each of the first and second filters and configured to selecting between the first and second filters, and a controller configured to control the switching unit and/or to select the second filter for acoustic communication, where the acoustic communication is adapted to the upper region of the audio band.

3 Claims, 15 Drawing Sheets

(51) Int. Cl.
*H04W 4/70* (2018.01)
*H04W 4/80* (2018.01)

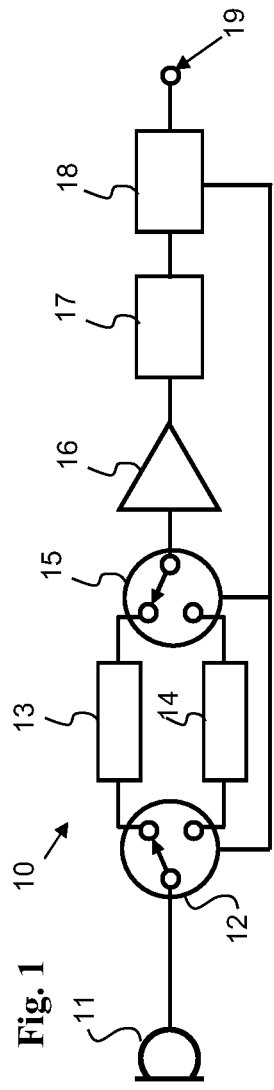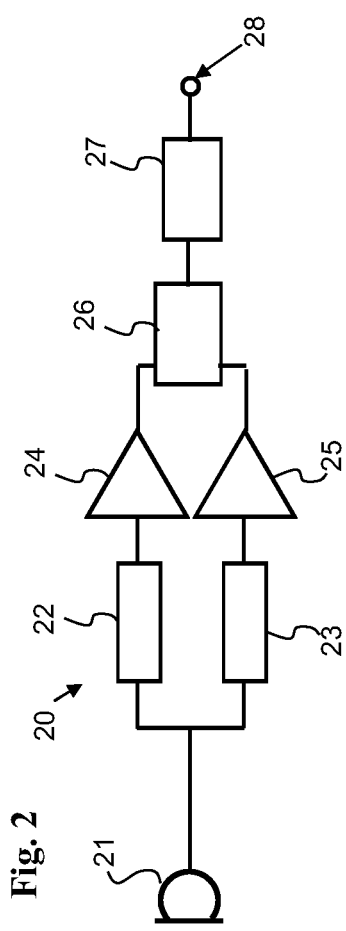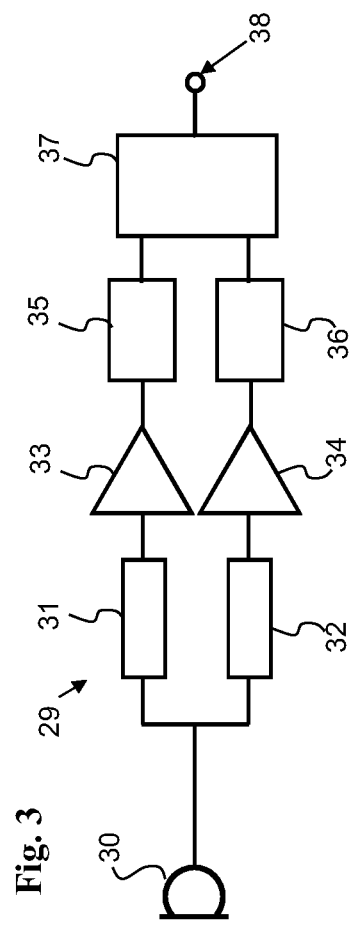

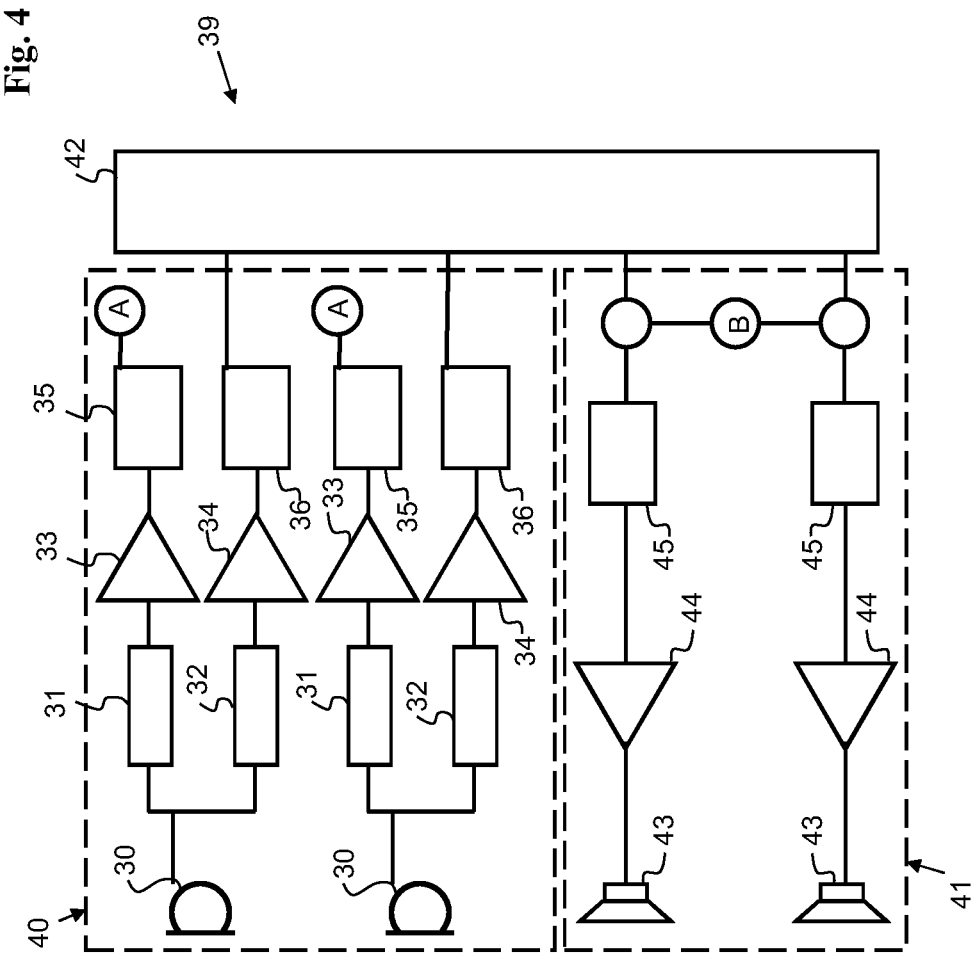

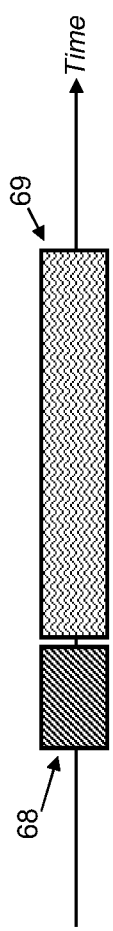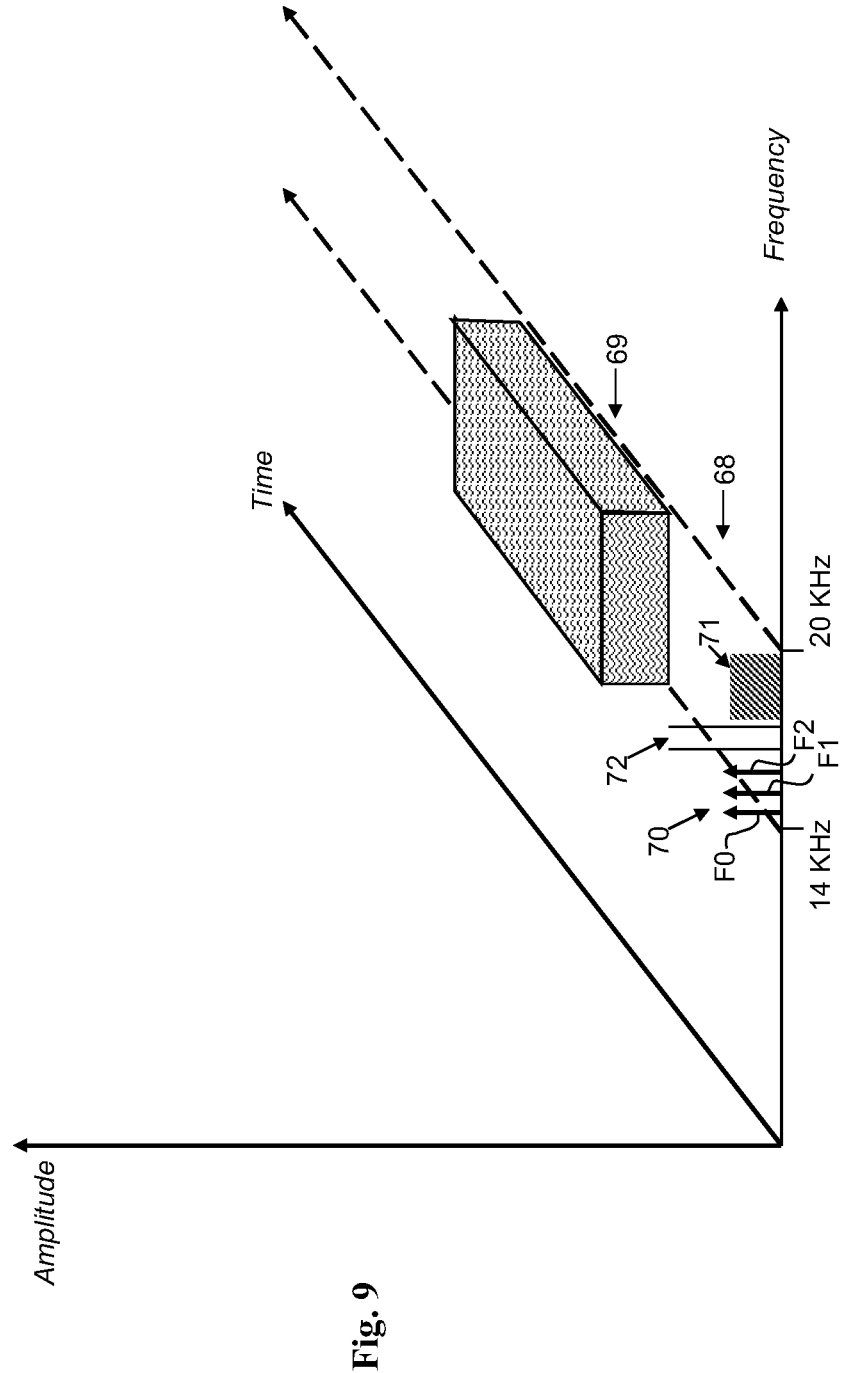
Fig. 8
Fig. 9

SYSTEMS AND METHODS FOR ACOUSTIC COMMUNICATION IN A MOBILE DEVICE

CROSS-REFERENCE TO RELATED APPLICATIONS

This application is a U.S. National Phase Application under 35 U.S.C. 371 of International Application No. PCT/IB2015/055011, which has an international filing date of Jul. 3, 2015, and which claims the priority benefit of U.S. Provisional Patent Application No. 62/021,018 filed Jul. 4, 2014, which is incorporated herein by reference in its entirety.

FIELD

The present application generally relates to systems and methods for acoustic communication, and, more particularly, but not exclusively, to input circuitry for acoustic communication.

BACKGROUND

The proliferation of very small battery operated devices as well as the proliferation of wireless personal area networking (WPAN) and wireless body area networking (WBAN) create a demand for communication methods consuming very low power. On the other hand, the proliferation of mobile telephones, and particularly smart telephones, suggests the use of such mobile devices to control and monitor various devices, including small battery operated devices. Acoustic communication is an old technology for communicating digital signals, however, for a very short range. There is thus a recognized need for, and it would be highly advantageous to have, a method and a system for medium range acoustic communication, and particularly a low-noise input circuitry, that overcomes the abovementioned deficiencies.

SUMMARY

Unless otherwise defined, all technical and scientific terms used herein have the same meaning as commonly understood by one of ordinary skill in the art to which this application belongs. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

Implementation of the method and system of the present embodiments involves performing or completing certain selected tasks or steps manually, automatically, or any combination thereof. Moreover, according to actual instrumentation and equipment of embodiments of methods and system described herein, several selected steps could be implemented by hardware or by software on any operating system of any firmware or any combination thereof. For example, as hardware, selected steps of the embodiments herein could be implemented as a chip or a circuit. As software, selected steps of an embodiment could be implemented as a plurality of software instructions being executed by a computer using any suitable operating system. In any case, selected steps of the method and system of embodiments herein could be described as being performed by a data processor, such as a computing platform for executing a plurality of instructions.

According to one embodiment there is provided a device and/or a method for acoustic communication including a microphone, a first filter coupled to the microphone adapted to pass signals in an audio band only, a second filter coupled to the microphone adapted to pass signals only in an upper region of the audio band, an analog to digital converter (ADC) unit, a switching unit connected between an input of the ADC unit and an output of each of the first and second filters, the switching unit configured for selecting between the outputs of the first and second filters, and a controller configured to control the switching unit to select the second filter for acoustic communication, where the acoustic communication is adapted to the upper region of the audio band.

According to another embodiment there is provided a device and/or a method for acoustic communication including a microphone, a first filter coupled to the microphone adapted to pass signals in an audio band and a first amplifier coupled to the filter, a second filter coupled to the microphone adapted to pass signals only in an upper region of the audio band and a first amplifier coupled to the filter, where the second amplifier has a higher gain than the first amplifier, at least one analog to digital converter (ADC) unit coupled to the first amplifier and the second amplifier, and a controller configured to select the second filter for acoustic communication, where the acoustic communication is adapted to the upper region of the audio band.

According to yet another embodiment there is provided a device and/or a method for acoustic communication including a microphone, a first filter coupled to the microphone adapted to pass signals in an audio band, the first filter communicatively coupled to a first analog to digital converter (ADC) unit, a second filter coupled to the microphone adapted to pass signals in an upper region of the audio band, the second filter communicatively coupled to a second ADC unit, and a controller communicatively coupled to the first and second ADC and configured to select the second filter for acoustic communication, where the acoustic communication is adapted to the upper region of the audio band.

According to still another embodiment there is provided a device and/or a method for acoustic communication including a first audio circuit including a first microphone, a first filter coupled to the first microphone adapted to pass signals in an audio band only, a second filter coupled to the microphone adapted to pass signals only in an upper region of the audio band, a first analog to digital converter (ADC) unit, and a first switching unit connected between an input of the ADC unit and an output of each of the first and second filters, the switching unit configured for selecting between the outputs of the first and second filters. The device and/or a method also including a second audio circuit including a second microphone, a third filter coupled to the first microphone adapted to pass signals in an audio band only, a fourth filter coupled to the microphone adapted to pass signals only in an upper region of the audio band, a second analog to digital converter (ADC) unit, and a second switching unit connected between an input of the ADC unit and an output of each of the first and second filters, the switching unit configured for selecting between the outputs of the first and second filters. The device and/or a method for acoustic communication also including a controller configured to control the first and second switching units to select the second and fourth filters for acoustic communication. Where the acoustic communication is adapted to the upper region of the audio band.

Further according to another embodiment there is provided a device and/or a method for acoustic communication as described above and additionally including a MIMO acoustic modem where at least one of the ADC and the controller is coupled to the MIMO acoustic modem.

Yet further according to another embodiment there is provided a device and/or a method for acoustic communication including a first audio circuit including a first microphone, a first filter coupled to the microphone adapted to pass signals in an audio band the first filter communicatively coupled to a first analog to digital (A/D) converter unit, a second filter coupled to the microphone adapted to pass signals in an upper region of the audio band the second filter communicatively coupled to a second analog to digital (A/D) converter unit, a second audio circuit including a second microphone, a third filter coupled to the first microphone adapted to pass signals in an audio band the first filter communicatively coupled to a third analog to digital (A/D) converter unit, a fourth filter coupled to the microphone adapted to pass signals in an upper region of the audio band, the fourth filter communicatively coupled to a fourth analog to digital (A/D) converter unit, and a controller communicatively coupled to the first, second, third and fourth A/D converters and configured to select the second and fourth filters for acoustic communication, where the acoustic communication is adapted to the upper region of the audio band, and where the second and fourth filters are communicatively coupled to a MIMO acoustic modem.

Still further according to another embodiment there is provided a device and/or a method for acoustic communication including a transmitter configured to send at least one pair of acoustic signals having different frequencies, and/or a receiver configured to detect a predefined difference between the frequencies of the at least one pair of acoustic signals, where at least one of the transmitter and receiver are in motion relative to the other one of the transmitter and receiver.

Even further according to another embodiment there is provided a device and/or a method for acoustic communication including a first plurality of microphones, and/or a first plurality of speakers, a controller selecting a second plurality of microphones selected from the first plurality of microphones, and/or a second plurality of speakers selected from the first plurality of speakers, where the selection is adapted according to maximal signal to noise ratio, and/or Doppler effect, and/or dispersion.

BRIEF DESCRIPTION OF THE DRAWINGS

Various embodiments are described herein with reference to accompanying drawings. It is stressed that the particulars shown and described are by way of example and for purposes of illustrative discussion of the embodiments presented. In this regard, no attempt is made to show structural details in more detail than is necessary for a fundamental understanding of the embodiment presented.

In the drawings:

FIG. 1 is a simplified schematic diagram of an electrical low-noise input switching circuitry;

FIG. 2 is a simplified schematic diagram of an electrical dual amplifier input circuitry;

FIG. 3 is a simplified schematic diagram of an electrical low-noise digital switching input circuitry;

FIG. 4 is a simplified schematic diagram of a high-sensitivity front-end circuit;

FIG. 8 is a simplified illustration of an acoustic communication protocol;

FIG. 9 is a simplified three-dimensional illustration of an acoustic communication protocol;

FIG. 17 is a simplified block diagrams of a single-stage active filter based on OP amplifier and a resistor-capacitor network;

FIG. 18 is a simplified block diagrams of a dual-stage active filter;

FIG. 19 is a simplified block diagrams of a band pass filter of the $2^{nd}$ order;

DETAILED DESCRIPTION

Figure 5:
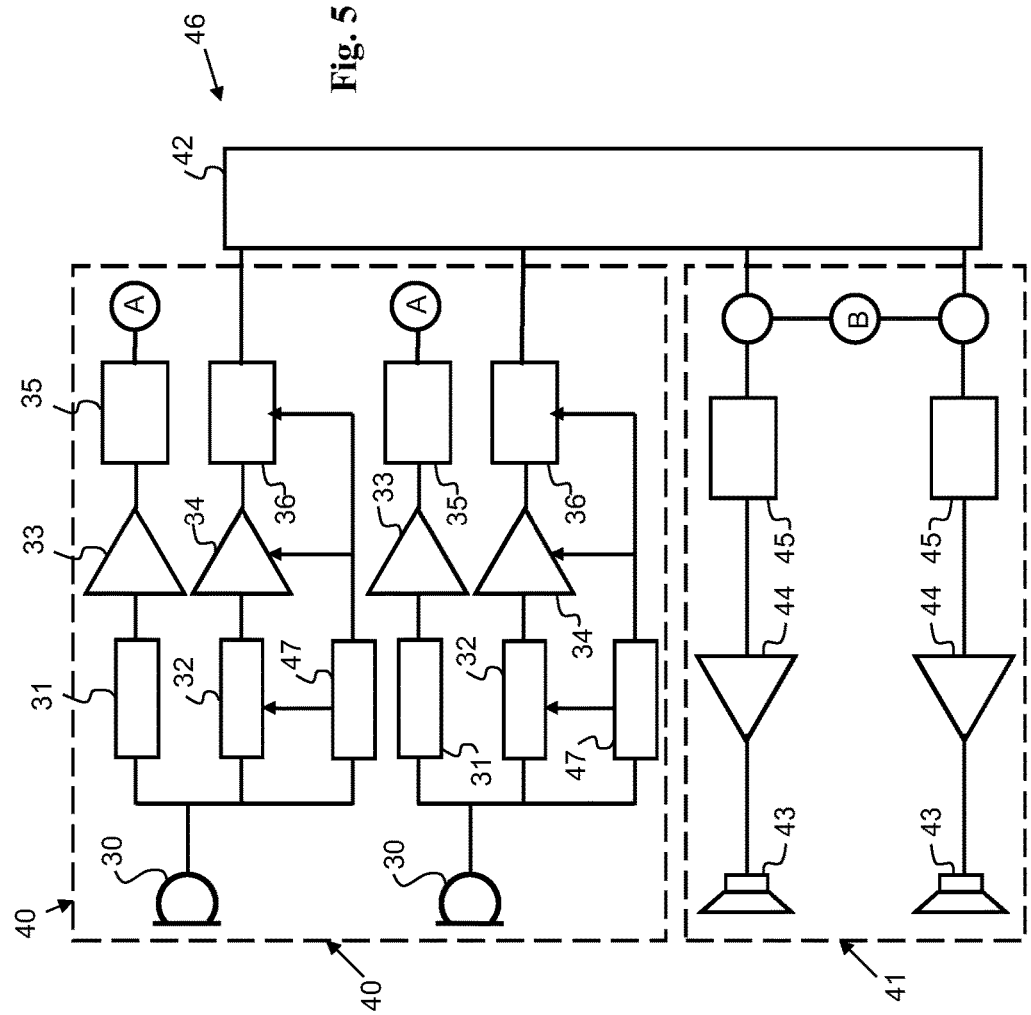
FIG. 5 is a simplified block diagram of an acoustic front-end circuit.

The principles and operation of methods and systems for acoustic communication, and, more particularly, but not exclusively, to low-noise input circuitry for acoustic communication, may be better understood with reference to the drawings and accompanying description.

Before explaining at least one embodiment in detail, it is to be understood that the descriptions, explanations and drawings are not limited to the details of construction and the arrangement of the components as set forth in the following descriptions or illustrated in the drawings. It is appreciated that other embodiments are possible, being practiced, or carried out, in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it is described.

The purpose of the systems and methods described in this document is to improve acoustic communication, particularly by lowering ambient noise present in the communication medium. As a non-limiting example, the description assumes a mobile telephone, or a smartphone. However, the embodiments described herein, and particularly the input circuits, may be used in any device suitable for acoustic communication.

Acoustic communication may be used to implement a wireless personal area network (WPAN, e.g., Wi-Fi) or wireless body area network (WBAN, e.g., Bluetooth). Acoustic communication is particularly useful for low-power WPAN or WBAN. Acoustic communication is particularly useful for detecting a beacon signal, or a wakeup signal provided to turn on an electric circuitry in stand-by mode. In such case a battery operated device is put in stand-by mode to save battery power. A beacon signal, or a wakeup signal, or any similar acoustic signal is sent to the device to wake it up from the stand-by mode. Therefore, while in stand-by mode, the device is 'listening' to the environment to detect such beacon signal, or a wakeup signal. This listening mode should have very low power consumption, which the device described herein may provide.

Many consumer devices, such as mobile telephone, smartphones, tablet computers, lap top computers, etc. have at least one microphone and at least one speaker and are therefore ready to support acoustic communication to communicate data. Such devices handle audio frequencies between zero Hertz and 20000 Hz However, only 0-8000 Hz are used for speech, voice, and music purposes. The audio spectrum above 14000 Hz is usually relatively quiet having low acoustic noise, while most humans cannot hear sound above 14000 Hz. Therefore, the region of 14000 Hz-20000 Hz is good for acoustic communication. Hence, a communication method in the 14000-20000 Hz spectrum may utilizes the smart phone's internal microphone and speaker to transmit and receive acoustic data. There can be many types of communication methods, like FSK, to transmit data from the speaker of a first smartphone to a microphone of a second smartphone, or between any other similar devices. Such use of mobile devices is applicable especially in the fields of "smart home", "home control" and "Internet Of things".

To transfer data between two smartphones, for example, an algorithm or application running on the first smartphone can utilize the phone's internal speaker to generate acoustic modem signals like FSK or any other modulations on acoustic carriers, in the designated 14000-16000 Hz band. The second smartphone may run a similar acoustic modem algorithm, and receive the acoustic signal using its microphone. The modem algorithm of the receiver may analyze in real time the acoustic signal received by the microphone of the second smartphone, and decode the data.

One problem with existing smartphone design is that in the receiving side of the second smart phone, the acoustic noise received on lower frequencies 0-14000 Hz is noisy and therefore significantly reduces the performance of the receiver modem algorithm. Such acoustic noise can be any noise detected in the environment, such as speech, sound generated by consumer instruments such as a radio or television set, ambient sound through an open window, etc.

A common microphone would have a noise density of about 10-18 nv/sqrt (Hz). This suggests that the noise floor in the band of the acoustic communication as described by Eq. 1:

$$V_n = 10 \text{ nv}\sqrt{6000} = 0.77 \cdot 10^{-6} \text{ v} = 0.77 \text{ } \mu v \qquad \text{Eq. 1:}$$

In normal conditions and environment the signal received by a microphone from music and voice in the band of 0-8000 Hz would generate about 1 mv-5 mv. Assuming that the receiver's input circuitry includes an amplifier having of a gain of 1000 the signal at the output of the amplifier is expected at 1 vptp for the 0-8000 Hz. This noise level is expected to be much higher than the signal of the acoustic communication.

When sampling the 1 vptp using an analog to digital converted (ADC) of 16 bits, each bit represent about 15.2 μV as described in Eq. 2:

$$1 Bit) Step = \frac{1}{2^{16}} = 15.2 \text{ } \mu V \qquad \text{Eq. 2}$$

This requires the acoustic communication signals to be higher than 15.2 μV, and to have at least 5 bits for the acoustic receiver modem the acoustic signal should be at least 32×15 μV=480 μV.

Reference is now made to FIG. 1, which is a simplified schematic diagram of an electrical low-noise input switching circuitry 10, according to one possible embodiment.

As shown in FIG. 1 the low-noise input switching circuitry 10 may include a microphone 11, a first switch 12 electrically coupled to microphone 11, a first filter 13 and a second filter 14, both electrically coupled to the first switch 12, a second switch 15 electrically coupled to the first filter 13 and second filter 14, optionally, an amplifier 16 electrically coupled to the second switch 15, an analog-to-digital converter (ADC) 17 electrically coupled to the amplifier 16 (or directly to the second switch 15), and a processor 18 electrically coupled to the ADC 17. The processor 18 is also controllably connected to the first switch 12 and second switch 15.

The first filter 13 may be a low-pass filter, for example, having the bandwidth of 0-20,000 Hz. The second filter 14 may be a band-pass filter having a bandwidth appropriate for acoustic communications such as 14,000 Hz-20,000 Hz. The processor 18 is configured to operate the first switch 12 and/or the second switch 15 to select between the first filter 13 and the second filter 14, thus selecting between the low-pass band for audio purposes and the band-pass band for acoustic communication. The processor 18 is configured select the first filter 13 or the second filter 14 according to the application in use, and/or according to the presence of an acoustic communication signal at the microphone.

Processor 18 may process and/or analyze the signal received from ADC 17 and produces the results to output 19. If acoustic communication is selected processor 18 may execute a demodulator algorithm for demodulating the communicated data from the acoustic signal.

It is appreciated that any circuitry appropriate for selecting between the first filter 13 or the second filter 14 is contemplated, and particularly, using only one of the first switch 12 and the second switch 15.

Reference is now made to FIG. 1, which is a simplified schematic diagram of an electrical dual-amplifier input circuitry 1, according to one possible embodiment.

As an option, the schematic diagram of FIG. 2 may be viewed in the context of the details of the previous Figures.

Of course, however, the schematic diagram of FIG. 2 may be viewed in the context of any desired environment. Further, the aforementioned definitions may equally apply to the description below.

As shown in FIG. 1, the dual-amplifier input circuitry 1 may include a microphone 2, a first filter 3 and a second filter 4 both electrically coupled to the microphone 2, a first amplifier 5 electrically coupled to the first filter 3 and a second amplifier 6 electrically coupled to the second filter 4, an analog-to-digital converter (ADC) 7 electrically coupled to both the first amplifier 5 and the second amplifier 6, and a processor 8 electrically coupled to the ADC 7.

The first filter 22 may be a low-pass filter, for example, having the bandwidth of 0-20,000 Hz. The second filter 23 may be a band-pass filter having a bandwidth appropriate for acoustic communications such as 14,000 Hz-20,000 Hz. The second amplifier 25 may have a gain much higher than the gain of the first amplifier 24. Therefore the acoustic communication signals in the higher band of 14,000 Hz-20,000 Hz are amplified much more than the audio signals, which are mostly below 14,000 Hz. Hence, the dual-amplifier input circuitry 20 includes a first signal path serving the regular audio channel, and a second signal path serving the acoustic communication channel.

The dual-amplifier input circuitry 20 has therefore two parallel signal paths operating at the same time. Processor 27 may process and/or analyze the signal received from ADC 26 and produce the results to output 28. The processor 27 may continuously analyze the output of ADC 26, and if acoustic communication is present processor 27 may execute a demodulator algorithm for demodulating the communicated data from the acoustic signal.

Reference is now made to FIG. 3, which is a simplified schematic diagram of an electrical low-noise digital switching input circuitry 29, according to one possible embodiment.

As an option, the schematic diagram of FIG. 3 may be viewed in the context of the details of the previous Figures. Of course, however, the schematic diagram of FIG. 3 may be viewed in the context of any desired environment. Further, the aforementioned definitions may equally apply to the description below.

As shown in FIG. 3, the low-noise digital switching input circuitry 29 may include a microphone 30, a first filter 31 and a second filter 32 both electrically coupled to the microphone 30, an optional first amplifier 33 electrically coupled to the first filter 31 and an optional second amplifier 34 electrically coupled to the second filter 32, a first analog-to-digital converter (ADC) 35 is electrically coupled to the first amplifier 33 (or directly to the first filter 31) and a second analog-to-digital converter (ADC) 36 is electrically coupled to the second amplifier 34 (or directly to the second filter 32), a processor 37 is electrically coupled to both the first ADC 35 and the second ADC 36.

The first filter 31 may be a low-pass filter, for example, having the bandwidth of 0-20,000 Hz. The second filter 32 may be a band-pass filter having a bandwidth appropriate for acoustic communications such as 14,000 Hz-20,000 Hz. Hence, the low-noise digital switching input circuitry 29 includes a first signal path including the first filter 31, the first amplifier 33, and the first ADC 35 serve the regular audio channel, and a second signal path including the second filter 32, the second amplifier 34, and second ADC 36 serve the acoustic communication channel.

Processor 37 may process and/or analyze the signal received from any of the first ADC 35 and the second ADC 36 or both, and produce the results to output 38. The processor 37 may continuously analyze the output of ADC 36, and if acoustic communication is present processor 37 may execute a demodulator algorithm for demodulating the communicated data from the acoustic signal.

The low-noise digital switching input circuitry 29 has therefore two parallel signal paths operating at the same time. The low-noise digital switching input circuitry 29 enables the smart phone (or any similar device) to receive audio signal (such as during conversation, or for speech recognition) simultaneously with acoustic communication data. This allows the smartphone to support various devices and sensors that can transmit acoustic signal to the telephone and from the telephone to an internet server, for example regarding Internet of Things (IoT) devices.

Therefore a mobile device having a microphone and a speaker (e.g. a smartphone) may support voice, sound and music capabilities in parallel to, or simultaneously with, acoustic communication capabilities.

Moreover, as mobile and/or hand-held devices such as smartphones, tablet computer, laptop computers, etc., may have several microphones and several speakers the acoustic communication may use the plurality of microphones, and/or the plurality of speakers, as a multiple-input circuitry, and the multiple speakers as a multiple-output circuitry.

Reference is now made to FIG. 4, which is a simplified schematic diagram of a high-sensitivity front-end circuit 39, according to one exemplary embodiment.

As an option, the schematic diagram of FIG. 4 may be viewed in the context of the details of the previous Figures. Of course, however, the schematic diagram of FIG. 4 may be viewed in the context of any desired environment. Further, the aforementioned definitions may equally apply to the description below.

As shown in FIG. 4, the high-sensitivity front-end circuit 39 may include a receiver front-end circuit 40 and a transmitter front-end circuit 41. A multiple-input multiple-output device (MIMO) 42 is electrically coupled to each of the signal paths of the front-end circuit 40 and transmitter front-end circuit 41.

The receiver front-end circuit 40 may include two or more signal paths, and the transmitter front-end circuit 41 may also include two or more signal paths. Each signal path of the receiver front-end circuit 40 may include a circuit such the low-noise input switching circuitry 10 shown and described with reference to FIG. 1, and/or the low-noise digital switching input circuitry 29 shown and described with reference to FIG. 3. As a not limiting example, FIG. 4 shows a receiver front-end circuit 40 based on the low-noise digital switching input circuitry 29 of FIG. 3.

The transmitter front-end circuit 1 may include two or more speakers 43, two or more power amplifiers and filters 44, each electrically coupled to a respective speaker 43, and two or more digital to analog converters (DAC) 45, each electrically coupled to a respective power amplifiers and filter 44.

The elements marked A and/or B designate possible connections to the audio system of the device.

Reference is now made to FIG. 5, which is a simplified block diagram of an acoustic front-end circuit 46, according to one exemplary embodiment.

As an option, the block diagram of FIG. 5 may be viewed in the context of the details of the previous Figures. Of course, however, the block diagram of FIG. 5 may be viewed in the context of any desired environment. Further, the aforementioned definitions may equally apply to the description below.

As shown in FIG. 5, front-end circuit 46 is similar to high-sensitivity front-end circuit 39 shown and described with reference to FIG. 4, except that front-end circuit 46 may have additional one or more wakeup circuits 47. Wakeup circuits 47 are used to enable the receiver acoustic communication circuitry to switch to standby mode during periods of no acoustic communication. Wakeup circuits 47 are then used to turn on the receiver acoustic communication circuitry upon initiation of acoustic communication. The receiver acoustic communication circuitry may include any or all of the second filter 32, the second amplifier 34 the second ADC 36 elements, as well as other elements associated with acoustic communication.

Figure 6:
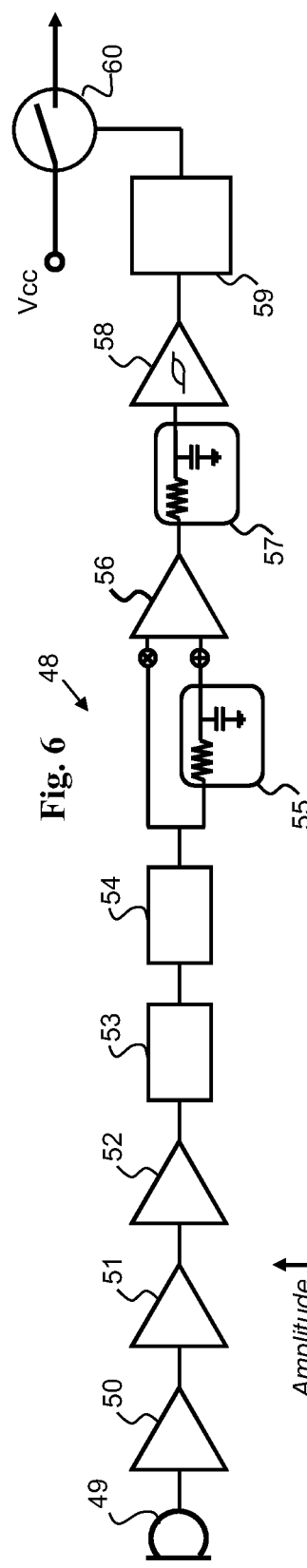
FIG. 6 is a simplified schematic diagram of a wake-up circuit.

Reference is now made to FIG. 6, which is a simplified schematic diagram of a wake-up circuit 48, according to one exemplary embodiment.

As an option, the schematic diagram of FIG. 6 may be viewed in the context of the details of the previous Figures. Of course, however, the schematic diagram of FIG. 6 may be viewed in the context of any desired environment. Further, the aforementioned definitions may equally apply to the description below.

As shown in FIG. 6, the awake-up circuit 48 may include a microphone 49 with no buffer, a buffer circuit 50 electrically coupled to the output of the microphone 49, a low noise amplifier 51 electrically coupled to the output of the buffer circuit 50, optionally an amplifier 52 electrically coupled to the output of the low-noise amplifier 51, an active filter 53 electrically coupled to the output of the amplifier 52 (or directly to the output of the low-noise amplifier 51), an energy detector 54 electrically coupled to the output of the active filter 53, a first delay circuit 55 electrically coupled to the output of the energy detector 54, a comparator 56 which first input is electrically coupled to the output of the first delay circuit 55 providing a threshold signal, and the other input electrically coupled to the output of the energy detector 54, a second delay circuit 57 energy electrically coupled to the output of the comparator 56, a Schmidt trigger device 58 electrically coupled to the output of the second delay circuit 57, and a SR flip-flop device 59 electrically coupled to the output of the Schmidt trigger device 58. The SR flip-flop device 59 controls the power voltage (e.g., Vcc) provided to the input circuit of the acoustic receiver, for example by means of switch 60.

The capacitor 49 may be an electret condenser microphone (ECM) capsule or a microelectromechanical system (MEMS) microphone. Both ECM and MEMS microphones are based on capacitance variations, and have to be connected to a buffer as described. The low noise amplifier (LNA) is used to boost the signal to allow working with a high-input-noise ultra-low-power active-filters.

Figure 7:
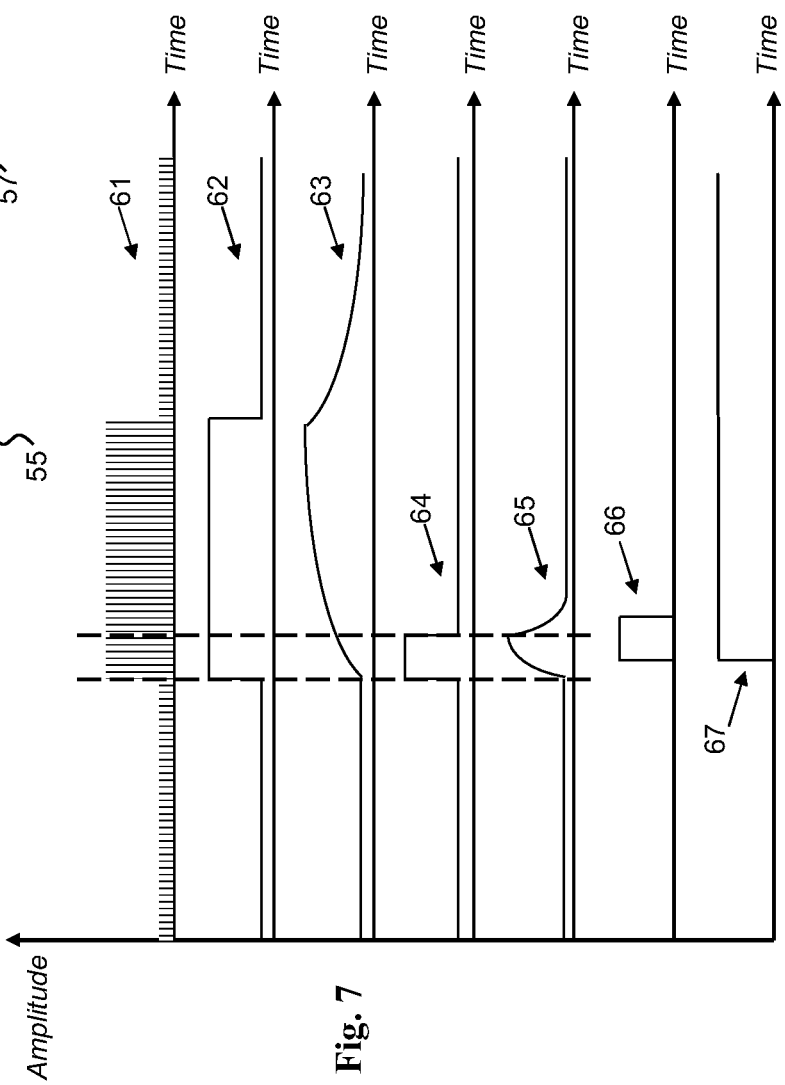
FIG. 7 is a simplified illustration of wake up signal waveforms as may be used by the wake-up circuit of FIG. 6.

Reference is now made to FIG. 7, which is a simplified illustration of wake up signal waveforms, according to one exemplary embodiment.

As an option, the illustration of FIG. 7 may be viewed in the context of the details of the previous Figures. Of course, however, the illustration of FIG. 7 may be viewed in the context of any desired environment. Further, the aforementioned definitions may equally apply to the description below.

As shown in FIG. 7, waveform 61 describes a wakeup signal provided at the output of the active filter 53. Waveform 62 describes a wakeup signal provided at the output of the energy detector 54. Waveform 63 describes a wakeup signal provided at the output of the first delay circuit 55. Waveform 64 describes a wakeup signal provided at the output of the comparator 56. Waveform 65 describes a wakeup signal provided at the output of the second delay circuit 57. Waveform 66 describes a wakeup signal provided at the input of the SR flip-flop device 59. Waveform 67 describes a power voltage (e.g., Vcc) provided to the input circuit of the acoustic receiver.

Waveform 61 at the output of the first active filter 53 shows a jump in signal level where a valid tone, or a plurality of valid tones, comprising the wakeup signal have been received. Waveform 6261 at the output of the energy detector 54 detects the jump and indicates the envelope of the wakeup signal. Comparator 56 then compares the current energy level, or signal envelope (indicated by Waveform 62) with the delayed signal (indicated by waveform 63), generating the pulse indicated by waveform 64. The wakeup detection pulse is further passed through the second delay circuit 57 to ensure that the detection pulse is not a false alarm spike, and then through the Schmidt trigger device 58. The SR flip-flop device 59 receives the output of the Schmidt trigger device 58 as shown by waveform 66. Waveform 66 is used to SET the Q output of the SR flip flop to "1" causing the VCC supply switch 60 to be closed as shown by waveform 67.

When the VCC supply voltage to the acoustic transceiver is closed the acoustic front-end circuit associated with the 14000 Hz-20000 Hz acoustic communication is turned on. Optionally a second circuit or a processor is also turned on for checking the validity of a preamble (wakeup) signal.

It is appreciated that any front-end circuit may be used with the awake-up circuit 48 of FIG. 6. For example, front-end circuits such as the low-noise input switching circuitry 10 shown and described with reference to FIG. 1, digital switching input circuitry 29 shown and described with reference to FIG. 3, and high-sensitivity front-end circuit 39 shown and described with reference to FIG. 4.

Reference is now made to FIG. 8, which is a simplified illustration of an acoustic communication protocol, according to one exemplary embodiment.

As an option, the illustration of FIG. 8 may be viewed in the context of the details of the previous Figures. Of course, however, the illustration of FIG. 8 may be viewed in the context of any desired environment. Further, the aforementioned definitions may equally apply to the description below.

As shown in FIG. 8, acoustic communication protocol may include a preamble signal or part 68 which may also be called a beacon signal or a marker signal, and a payload part 69 which carries the acoustic communication data.

Reference is now made to FIG. 9, which is a simplified three-dimensional illustration of an acoustic communication protocol, according to one exemplary embodiment.

As an option, the illustration of FIG. 9 may be viewed in the context of the details of the previous Figures. Of course, however, the illustration of FIG. 9 may be viewed in the context of any desired environment. Further, the aforementioned definitions may equally apply to the description below.

FIG. 9 shows the components of the acoustic communication protocol in the time domain and in the frequency domain. As an option, the illustration of FIG. 9 may be viewed in the context of the details of the previous Figures. Of course, however, the illustration of FIG. 9 may be viewed in the context of any desired environment. Further, the aforementioned definitions may equally apply to the description below.

As shown in FIG. 9, the acoustic communication protocol may include a preamble part and a payload part (for example, corresponding to the preamble part 68 and payload part 69 of FIG. 8). The preamble part may include one or more wakeup tones 70 such as F0, F1, and F2. The preamble part may also include modulation parameters 71 of the acoustic payload. The preamble part may also include a guard-band 72 separating in the frequency domain between the frequency band carrying the wakeup tones and the frequency band carrying the payload modulation parameters.

The wakeup tones F0, F1, F2 etc. are detected, for example, by the awake-up circuit 48 shown and described with reference to FIG. 6. In this respect, active filter 53 may be tuned to the range where the signaling tones (e.g., F0, F1, F2) exist. Thus wakeup circuit 48 may check and verify the presence of the wakeup signal as shown and described with reference to FIG. 7. For example, by detecting the envelope of the wakeup signal and comparing to a delayed version of the envelope.

The wakeup signal uses particular tones which provide robustness against Doppler effect and carrier shift. The wakeup signal can be further validated by the difference between the wakeup tones. For example, having x and y values such as x=F1−F0 and y=F2−F0 may enable detection of the x and y parameters in spite of a Doppler shift and/or a carrier shift.

Figure 10:
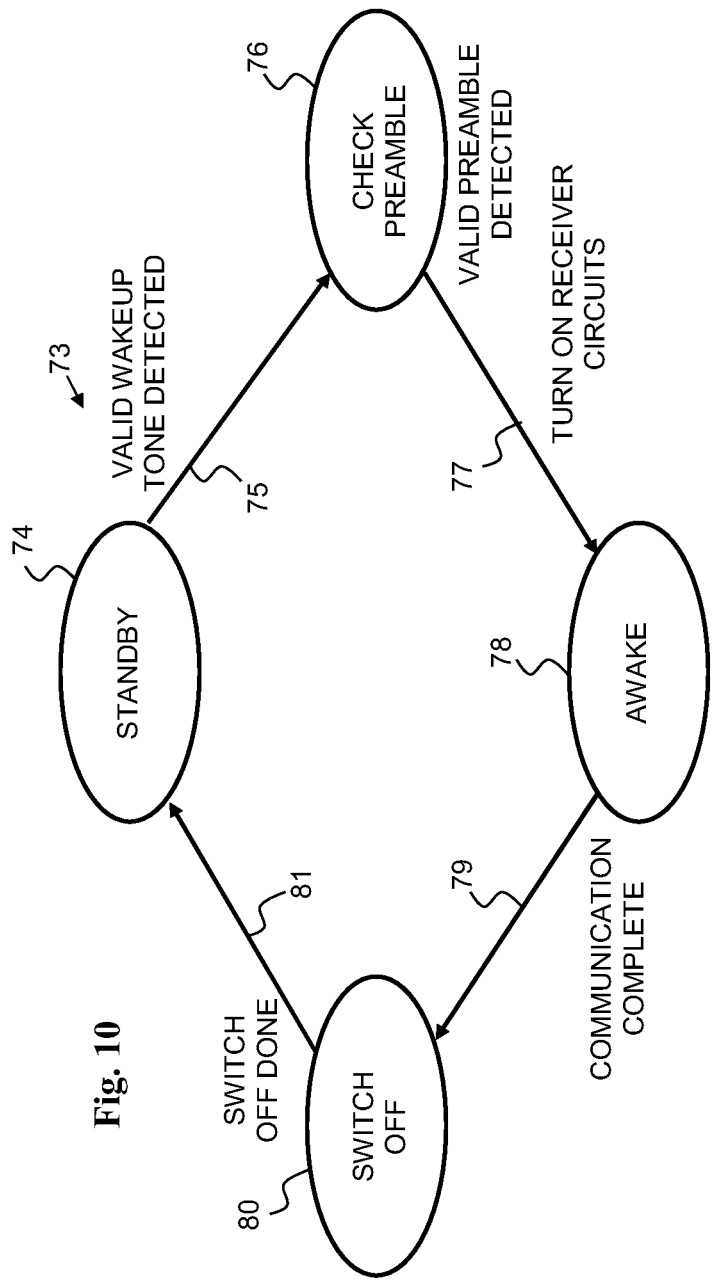
FIG. 10 is a simplified diagram of a state-machine for the wakeup protocol.

Reference is now made to FIG. 10, which is a simplified diagram of a state-machine 73 for the wakeup protocol, according to one exemplary embodiment.

As an option, the diagram of FIG. 10 may be viewed in the context of the details of the previous Figures. Of course, however, the diagram of FIG. 10 may be viewed in the context of any desired environment. Further, the aforementioned definitions may equally apply to the description below.

As shown in FIG. 10, the state-machine 73 is normally in the 'standby' state 74. When a wakeup tone, or a constellation of wakeup tones) is detected (transition 75) state-machine 73 may transit to a 'check preamble' state 76. If then a valid preamble is detected the state-machine 73 may transit (77) to an 'awaken" state 78. At this time the wakeup circuit turns on the receiver circuits, for example, by providing power (Vcc) to the receiver circuits. Optionally, a special HW or processor is turned on as well. It is appreciated that the modulation parameters are decoded in the 'check preamble' state 76.

In the 'awaken' state 78 the receiver, demodulates, and processes the acoustic communication data received in the payload part of the acoustic communication protocol. In the communication phase is completed state-machine 73 may transit (79) to a 'switch-off' state 80 where the receiver shuts-down and sets the wakeup circuitry. Then the state-machine 73 may transit (81) back to the 'standby' state 74.

Figure 11:
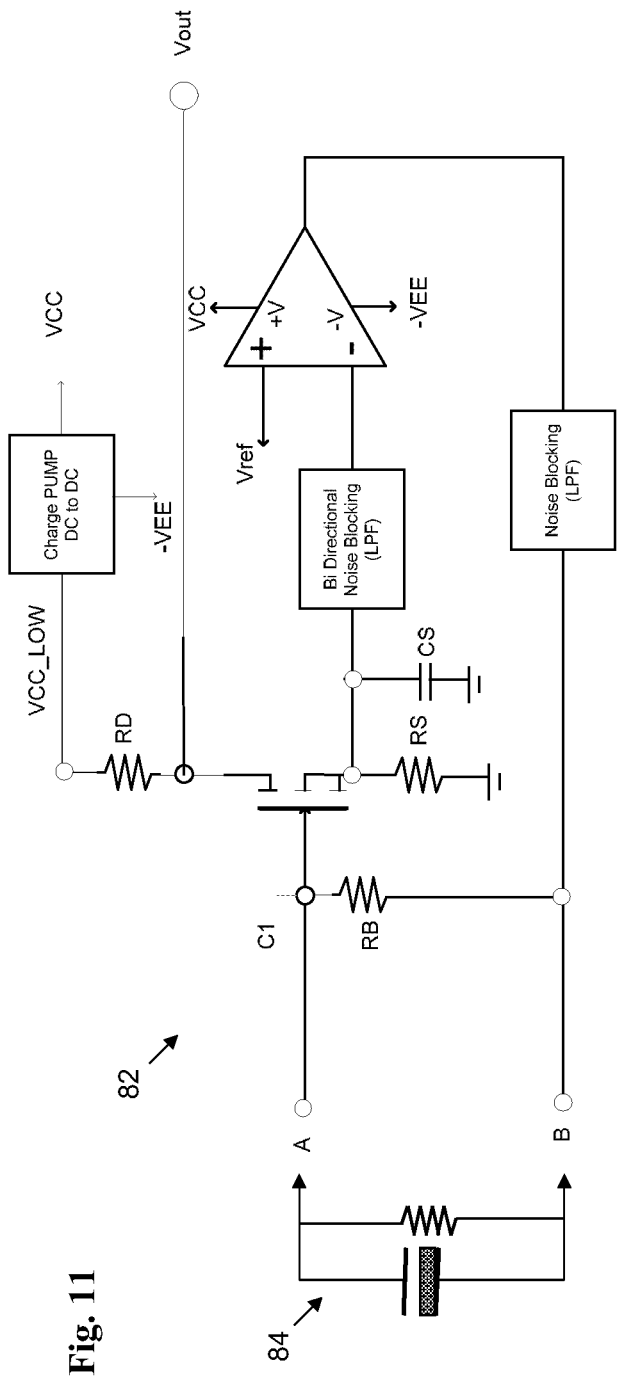
FIG. 11 is a simplified block diagram of buffer circuit based on a MOSFET transistor.
Figure 12:
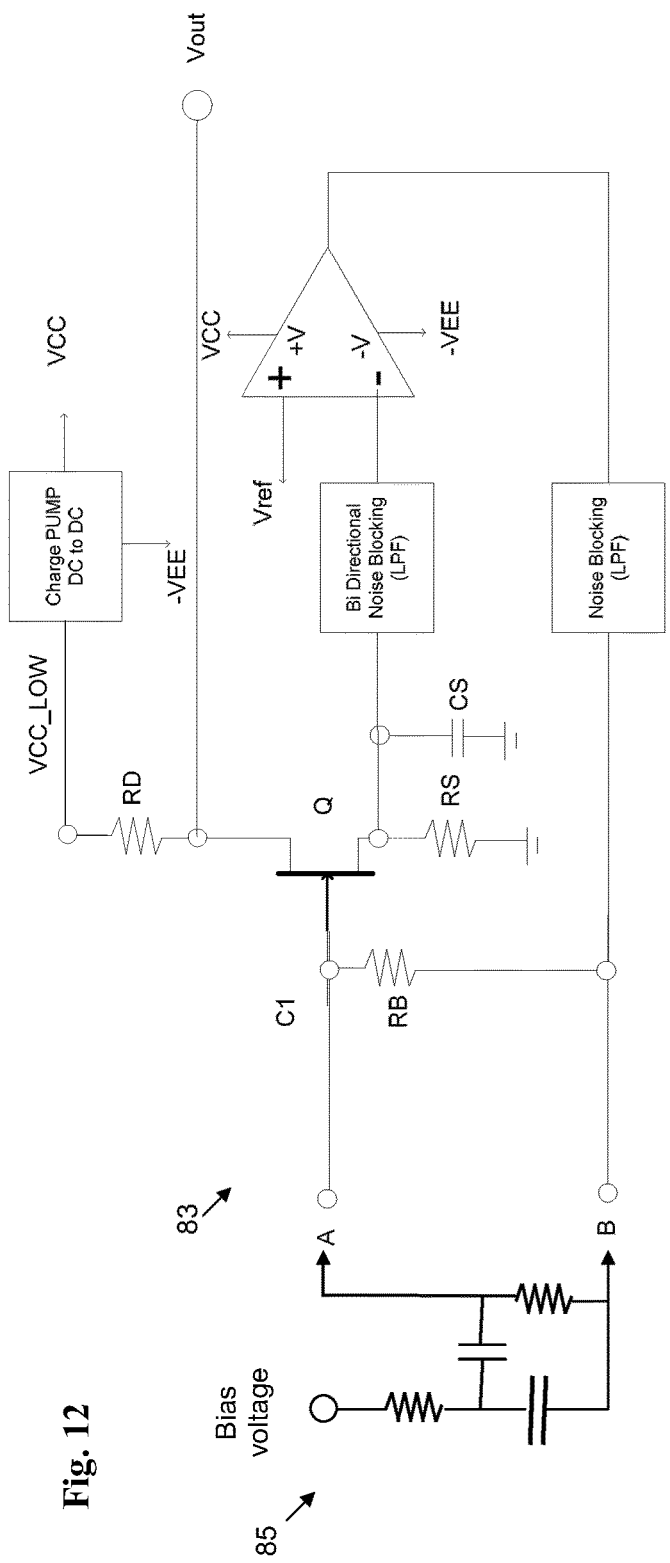
FIG. 12 is a simplified block diagram of buffer circuit based on a JFET transistor.

Reference is now made to FIG. 11, and to FIG. 12, which are two versions of a simplified block diagram of a buffer circuit 82 and 83, respectively, according to two exemplary embodiments. Buffer circuit 82 is based on a MOSFET transistor while buffer circuit 83 is based on JFET transistor.

As an option, the block diagrams of FIGS. 11 and 12 may be viewed in the context of the details of the previous Figures. Of course, however, the block diagrams of FIGS. 11 and 12 may be viewed in the context of any desired environment. Further, the aforementioned definitions may equally apply to the description below. Particularly, buffer circuit 82 and/or 84 may be used in the context of the wake-up circuit 48 of FIG. 6.

As shown in FIG. 11, the buffer circuit 82 may be connected to a typical electret condenser microphone (ECM) 84. However, alternatively, the buffer circuit 82 may be connected to a typical MEMS microphone 85 shown in FIG. 12. Similarly, as shown in FIG. 12, the buffer circuit 83 may be connected to a typical MEMS microphone 85. However, alternatively, the buffer circuit 83 may be connected to a typical electret condenser microphone (ECM) 84 as shown in FIG. 11.

Buffer circuits 82 and 83 are based on MOSFET and JFET transistors (respectively) working in the saturation region for amplification. Buffer circuits 82 and 83 use wide (e.g., high-power) transistors having large IDSS. The SNR for these circuits is given by Eq. 3, where Vx is either Vt or Vp the associate threshold voltage of a MOSFET and pinch off voltage of JFET.

$$SNR = \frac{g_m^2 R_D^2 \langle V_{IN}^2 \rangle}{4KT\left(\frac{2}{3}\right)g_m \Delta f R_D^2} \quad \text{Eq. 3}$$

$$= g_m \frac{\langle V_{IN}^2 \rangle}{4KT\left(\frac{2}{3}\right)\Delta f}$$

$$= g_m$$

$$= -\frac{2}{V_X}\sqrt{I_D I_{DSS}} \frac{\langle V_{IN}^2 \rangle}{4KT\left(\frac{2}{3}\right)\Delta f}$$

It is therefore possible to decrease Id significantly and still get excellent SNR similar to high Id buffer by using an OP amplifier working at low gain band width—on a DC region and hence consuming low power. The OP amplifier sample the voltage from the source pin and forces Vref on the source pin such that Id=Vref/RS.

To work in saturation Vds>Vgs−Vx. As Id is small and Idss is large the difference is small, in the range of a few mV. Thus, gain stage of the transistor, which includes RD and the transistor Q, may work at extremely low supply voltage designated VCC_LOW.

As the OP amplifier works at extremely low supply current there may be noise terms in its input and its output. To block such noise sources the buffer circuits includes a bi-directional noise blocking filter and/or a second noise blocking filter. Both filters are implemented as passive RC filters as shown in FIGS. 13 and 14.

Figure 14:
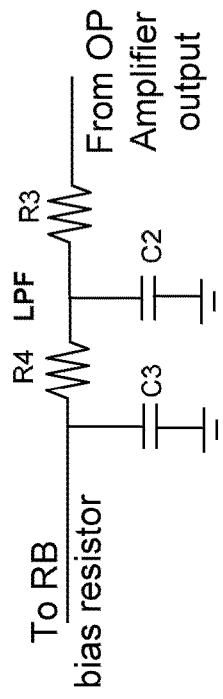
FIG. 14 is a simplified electric schematic diagrams for another type of a noise-blocking filter.
Figure 13:
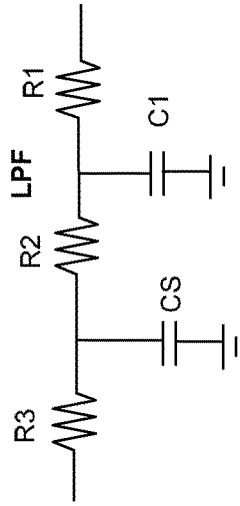
FIG. 13 is a simplified electric schematic diagrams for a noise-blocking filter.

Reference is now made to FIG. 13, and to FIG. 14, which are two simplified electric schematic diagrams for a noise-blocking filter, according to two exemplary embodiments.

As an option, the electric schematic diagrams of FIGS. 13 and 14 may be viewed in the context of the details of the previous Figures. Of course, however, the electric schematic diagrams of FIGS. 13 and 14 may be viewed in the context of any desired environment. Further, the aforementioned definitions may equally apply to the description below.

As the OP amplifier works at extremely low supply current there may be noise terms in its input and its output. To block such noise sources a bi-directional noise-blocking filter may be sued. Such noise-blocking filter may be implemented using passive resistor-capacitor (RC) filters. The electric schematic diagrams of FIGS. 13 and 14 present two possible variations of such bi-directional noise-blocking filters that can be used in the context of FIGS. 11 and 12 as well as other parts of the system described below.

Figure 15:
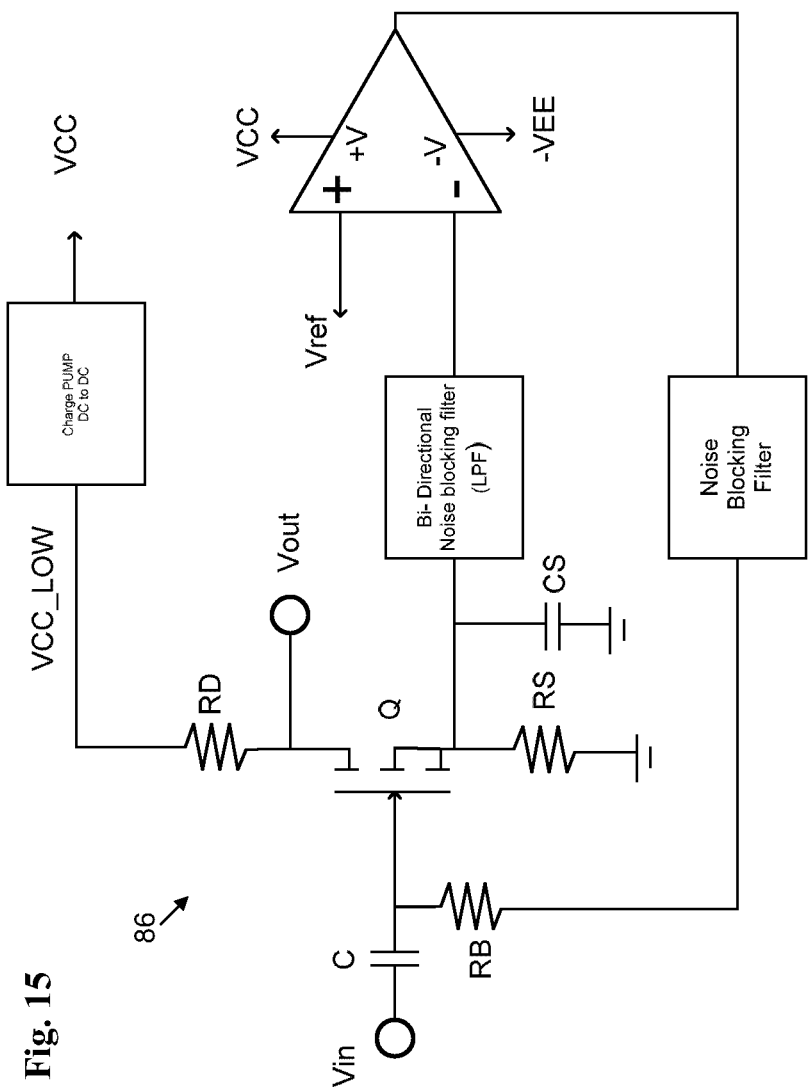
FIG. 15 is a simplified block diagram of low-noise amplifier (LNA) circuit based on a MOSFET transistor.
Figure 16:
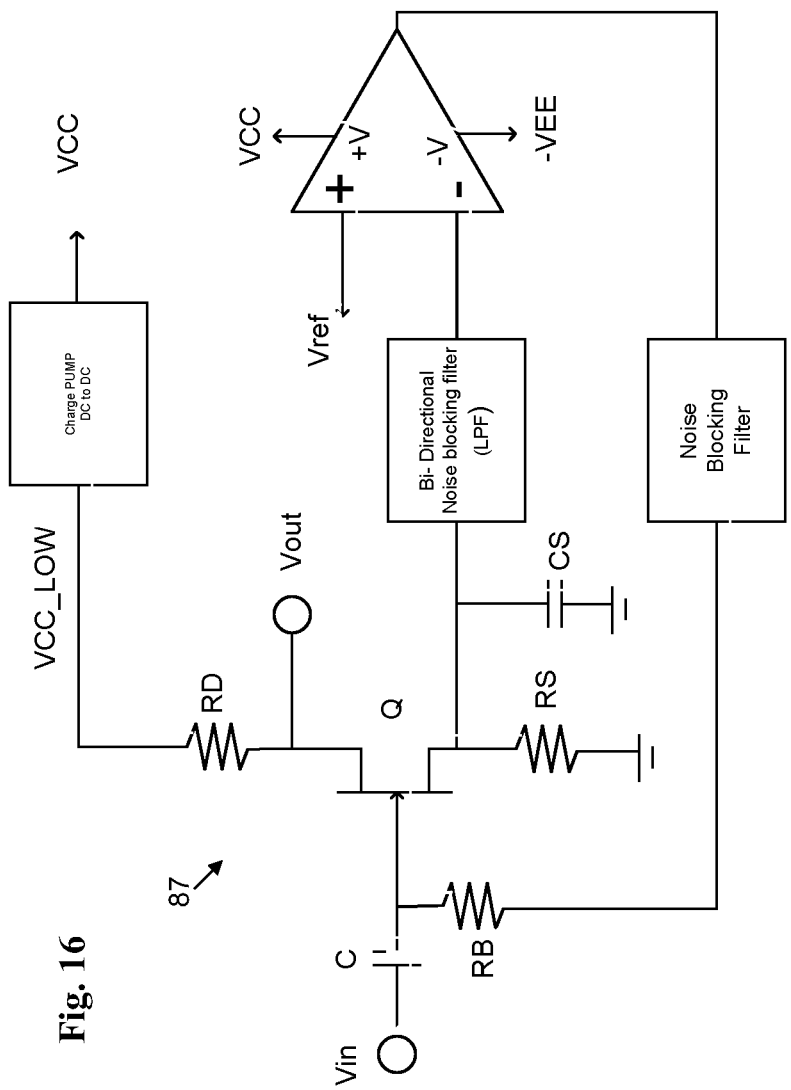
FIG. 16 is a simplified block diagram of a low-noise amplifier (LNA) circuit based on a JFET transistor.

Reference is now made to FIG. 15, and to FIG. 16, which are two version of a simplified block diagram of low-noise amplifier (LNA) circuits 86 and 87, respectively, according to two exemplary embodiments.

As an option, the block diagrams of FIGS. 15 and 16 may be viewed in the context of the details of the previous Figures. Of course, however, the block diagrams of FIGS. 11 and 12 may be viewed in the context of any desired environment. Further, the aforementioned definitions may equally apply to the description below. Particularly, LNA circuits 86 and/or 87 may be used in the context of the wake-up circuit 48 of FIG. 6.

Buffer circuit 86 is based on a MOSFET transistor while buffer circuit 87 is based on JFET transistor in a manner similar to the buffer circuits of FIGS. 11 and 12. Both LNA circuits use a low pass filter to reject noise from the OP amplifier.

Figure 17:
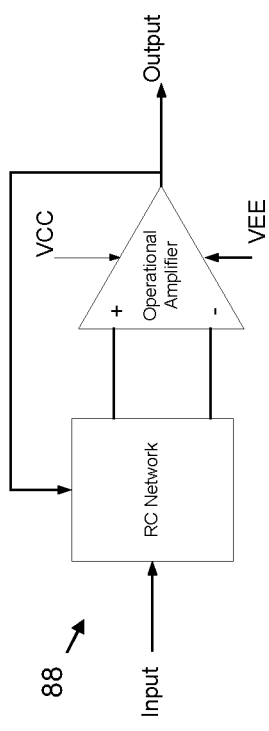
FIGS. 17 18, and 19 are simplified block diagrams of three types of active filters.
Figure 18:
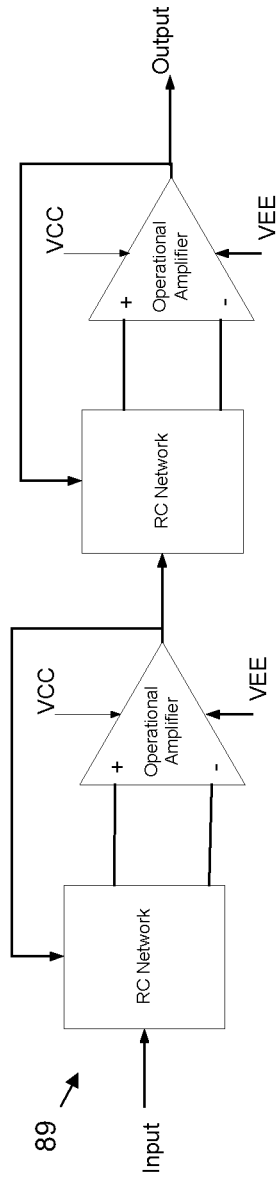
Figure 19:
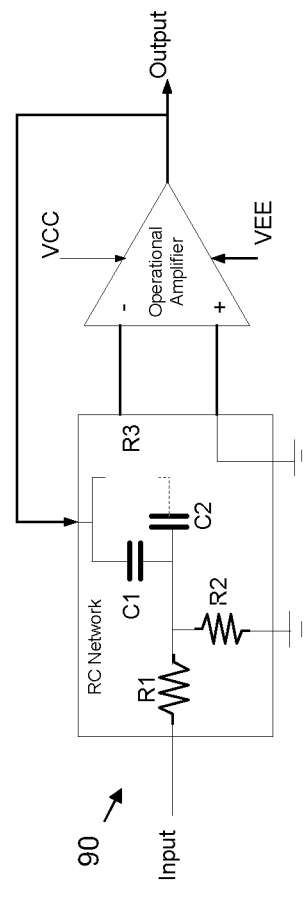

Reference is now made to FIG. 17, FIG. 18, and FIG. 19, which are simplified block diagrams of three types of active filters, according to three exemplary embodiments.

As an option, the block diagrams of FIGS. 17 18, and 19 may be viewed in the context of the details of the previous Figures. Of course, however, the block diagrams of Fig. FIGS. 17, 18, and 19 may be viewed in the context of any desired environment. Further, the aforementioned definitions may equally apply to the description below. Particularly, the active filters of any of FIGS. 17 18, and 19 may be used in the context of the wake-up circuit 48 of FIG. 6.

FIG. 17 shows a single-stage active filter 88 based on OP amplifier and a resistor-capacitor network, designated as an RC network. FIG. 18 shows a dual-stage active filter 89 including two stages of the active filter 88 of FIG. 17. It is appreciated that a multi-stage active filter may be constructed using any number of stages such as the active filter 88 of FIG. 17. The stages are typically arranged serially and the RC values are designed to implement the desired response such as a Butterworth filter, a Chebyshev filter, an elliptic filter, etc. FIG. 19 illustrates one stage of band pass filter 90 of the $2^{nd}$ order.

Figure 20:
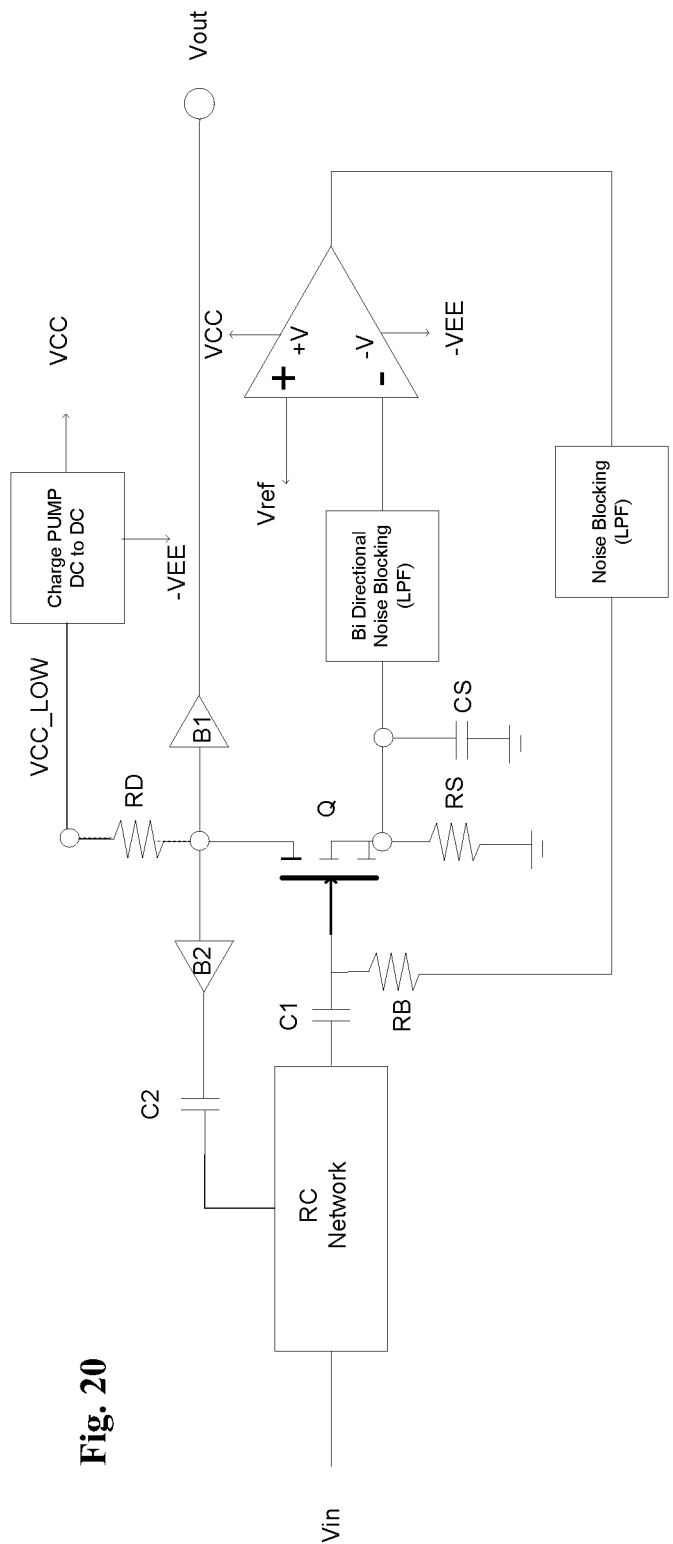
FIG. 20 is a simplified block diagrams of MOSFET-based ultra-low-power active-filter.
Figure 21:
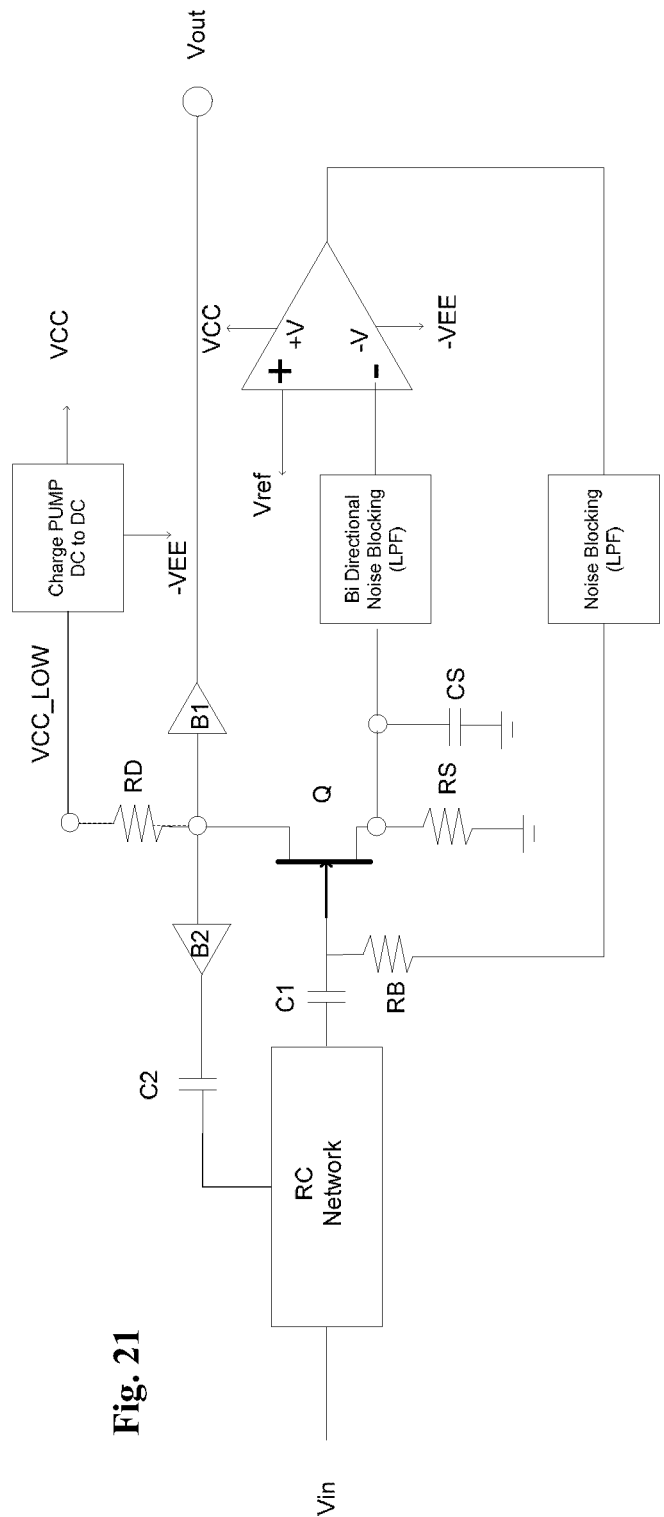
FIG. 21 is a simplified block diagrams of JFET-based ultra-low-power active-filter.

Reference is now made to FIG. 20, which is a simplified block diagrams of MOSFET-based ultra-low-power active-filter, according to one exemplary embodiment, and to FIG. 21, which is a simplified block diagrams of JFET-based ultra-low-power active-filter, according to one exemplary embodiment As an option, the block diagrams of FIGS. 20 and 21 may be viewed in the context of the details of the previous Figures. Of course, however, the block diagrams of FIGS. 20 and 21 may be viewed in the context of any desired environment. Further, the aforementioned definitions may equally apply to the description below. Particularly, the active filters of any of FIGS. 20 and 21 may be used in the context of the wake-up circuit 48 of FIG. 6.

In FIGS. 20 and 21, the elements designated by B1 and B2, are buffers which may be implemented using a wire or a source follower buffer. For example, implementations of elements B1 and/or B2 may be based on any of the active filters shown and described with reference to FIGS. 17 18, and 19.

Figure 22:
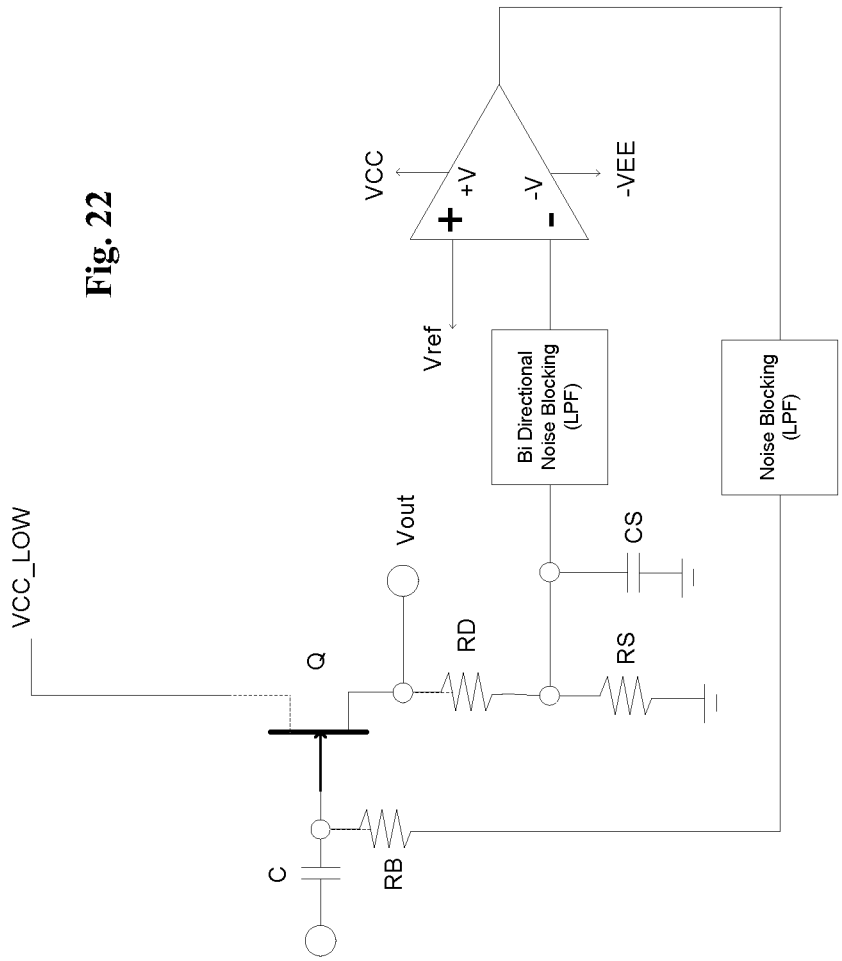
FIG. 22 is a simplified schematic diagram of a JFET-based noise-blocking Voltage-buffer.
Figure 23:
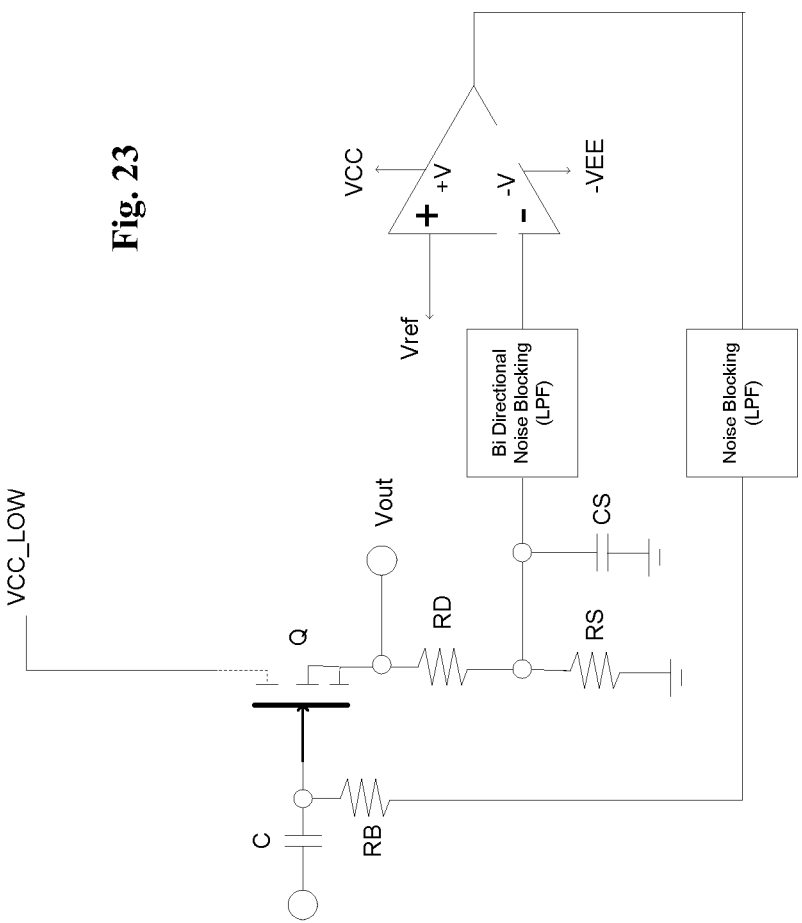
FIG. 23 is a simplified schematic diagram of a MOSFET-based noise-blocking Voltage-buffer.

Reference is now made to FIG. 22 and to FIG. 23, which are a simplified schematic diagrams of two versions of a noise-blocking Voltage-buffer, according to two exemplary embodiments.

As an option, the schematic diagrams of FIGS. 22 and 23 may be viewed in the context of the details of the previous Figures. Of course, however, the schematic diagrams of FIGS. 22 and 23 may be viewed in the context of any desired environment. Further, the aforementioned definitions may equally apply to the description below.

FIGS. 22 and 23 illustrate two examples of a single-stage active filters. These active filters may use wide (e.g., high-power) transistor that allows low Id and hence low Vgs−Vx (Vx is wither Vp or Vt) and hence a low supply voltage indicated as VCC_LOW. In this sense the single-stage active filters of FIGS. 22 and 23 work in the same manner as the microphone buffer described above.

The noise-blocking Voltage-buffer of FIG. 22 is based on JFET while the noise-blocking Voltage-buffer of FIG. 23 is based on MOSFET.

It is appreciated that the embodiments shown and described with reference to FIGS. 20, 21, 22 and 23 include one or more bi-directional noise blocking filters that may be implemented using a passive RC network and shown and described herein.

The VCC_LOW may be in the range of 10 mV-100 mV. A DC-to-DC step-down charge-pump may be used to provide the VCC_LOW voltage. The DC-to-DC step-down charge-pump may use a 32 KHz square wave to provide efficiency of about 95%-99%.

Thus, the awake-up circuit 48 of FIG. 4, is expected to consume about 50 nWatts to 500 nWatts, from a 3V battery, or a current in the range of 17 nA to 130 nA, which are considerably low compared to the acoustic front end of FIG. 4.

It is appreciated that the system and method described herein improve the performance of a common voice device such as a smart phone, and particularly for acoustic communication. The improvement, particularly on the receiver side, may be estimated by 26 dB. Further improvement of the acoustic communication is achieved by using multiple microphones and speakers. Moreover, the embodiments described herein provide an efficient a wakeup mechanism further improving acoustic communication in standby, consume ultra-low power.

It is appreciated that the system and method described herein increase the distance for acoustic communication at normal acoustic (sound) levels to 20 meters and above. The effect of voice signals normally interfering with the receiving side of the acoustic modem are reduced. The use of a MIMO stretcher may further enhance the range of the acoustic communication.

Figure 24:
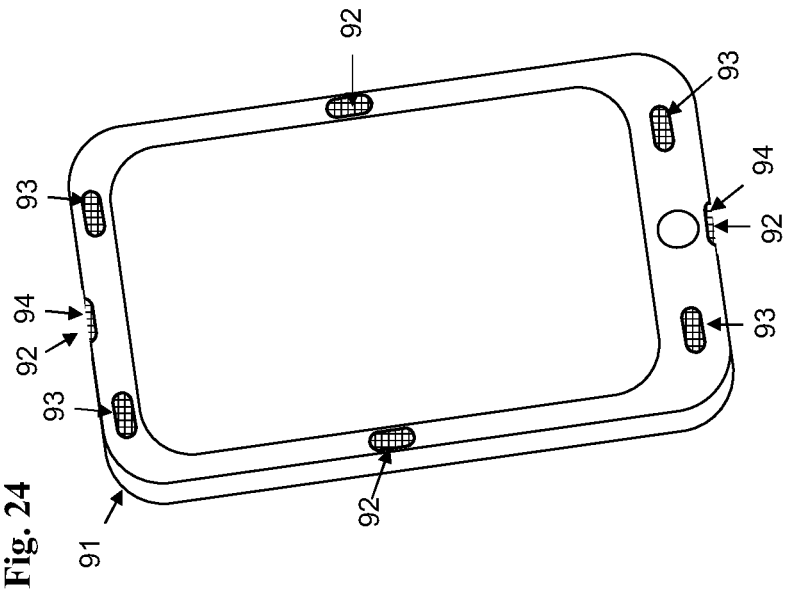
FIG. 24 is a simplified illustration of a MIMO-enabled mobile telephone.

Reference is now made to FIG. 24, which is a simplified illustration of a MIMO-enabled mobile telephone 91, according to one exemplary embodiment.

As an option, the illustration of FIG. 24 may be viewed in the context of the details of the previous Figures. Of course, however, the illustration of FIG. 24 may be viewed in the context of any desired environment. Further, the aforementioned definitions may equally apply to the description below.

The MIMO-enabled mobile telephone 91 may be any communication device including a MIMO arrangement for acoustic communication. As shown in FIG. 24, the MIMO-enabled mobile telephone 91 may include a telephone (e.g., a smartphone) including a plurality of microphones 92 and/or speakers 93. The positions of microphones 92 and/or speakers 93 in FIG. 24 are for example only. It is appreciated that any number of microphones 92 and any number speakers 93 may be positioned anywhere on the MIMO-enabled mobile telephone 91, such as on the front panel, on the back panel (not shown), and on the sides (such as microphones 94).

It is appreciated that the arrangement of microphones 92 and/or speakers 93 can be adapted to a prevailing and/or preferred direction of acoustic communication. It is appreciated that the arrangement of microphones 92 and/or speakers 93 can be adapted to a plurality of prevailing and/or preferred direction of acoustic communication, for example, by selecting a particular plurality of microphones 92 and/or speakers 93 for each direction of acoustic communication.

For example, three microphones 92 and/or three speakers 93 may provide three pairs of microphones 92 and/or speakers 93 where each pair is adapted to a particular direction of acoustic communication.

For example, the placement of microphones 92 and/or speakers 93 can be adapted to a particular directions, where each direction may specify a particular plurality of X and Y, coordinates of placement of the respective microphones 92 and/or speakers 93 for the particular direction of acoustic communication.

With M directions, we may have, for example, M times N1 pairs of X and Y placement coordinates. Using, for example, N2>N1 microphones and/or speakers it may be possible to locate the best N2 pairs of X and Y placement coordinates, such that a specific communication error (e.g., bit error rate) criteria is met.

Other criteria are also possible, for example, microphones 92 and/or speakers 93 used for acoustic communication may be arranged and/or selected such that there is a minimal number of nulls, and/or such that noise is minimized, and/or to enhance signal-to-noise ratio (SNR). Any combination, or weighted combination, of criteria is also possible and contemplated.

The placement of microphones 92 and/or speakers 93 may be adapted to the selected frequency and/or wavelength range of the acoustic communication. For example, the wavelength of acoustic communication signal with frequency range 14000 Hz to 20000 Hz is about 2.4 cm to 1.7 cm.

For example, it is possible to use three microphones for each direction. The placement coordinates for the three microphones can be determined such that reception of the signal is maximized. This can be repeated for a plurality of directions.

For example, it is possible to use ten microphones and/or speaker and place them on a cell phone such that for each direction there are at least three microphones and/or speakers placed near the optimal location.

It is appreciated that certain features of the embodiments presented herein may also be provided in combination in a single embodiment. Conversely, various features described in the context of a single embodiment, may also be provided separately or in any suitable sub-combination.

Although the described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A mobile device, comprising:
a first audio circuit comprising
a first microphone,
a first filter coupled to said first microphone adapted to pass signals in an audio band only,
a second filter coupled to said first microphone adapted to pass signals only in an upper region of said audio band,
a first analog to digital converter (ADC) unit communicatively coupled to a MIMO acoustic modem,
at least one of:
a first switching unit connected between an input of said first ADC unit and an output of each of said first and second filters, said first switching unit configured for selecting between said outputs of said first and second filters,
a first amplifier coupled to said first filter, and a second amplifier coupled to said second filter, wherein said second amplifier has a higher gain than said first amplifier, and
said first analog to digital converter (ADC) unit coupled to at least one of said first filter and said first amplifier, and a second analog to digital converter (ADC) unit coupled to at least one of said second filter and said second amplifier, said second ADC being communicatively coupled to said MIMO acoustic modem, and
a controller configured to perform at least one of:
control said first switching unit, to select said second filter for acoustic communication,
select said second amplifier for acoustic communication, and
select said second ADC for acoustic communication; and
a second audio circuit comprising
a second microphone,
a third filter coupled to said second microphone adapted to pass signals in an audio band only,
a fourth filter coupled to said first microphone adapted to pass signals only in an upper region of said audio band,
a third analog to digital converter (ADC) unit communicatively coupled to said MIMO acoustic modem,
at least one of:
a second switching unit connected between an input of said third ADC unit and an output of each of said third and fourth filters, said second switching unit configured for selecting between said outputs of said third and fourth filters,
a third amplifier coupled to said third filter, and a fourth amplifier coupled to said fourth filter, wherein said fourth amplifier has a higher gain than said third amplifier, and
said third analog to digital converter (ADC) unit coupled to at least one of said third filter and said third amplifier, and a fourth analog to digital converter (ADC) unit coupled to at least one of said fourth filter and said fourth amplifier, said fourth ADC being communicatively coupled to said MIMO acoustic modem,
said controller configured to perform at least one of:
control said second switching unit, to select said fourth filter for acoustic communication,
select said fourth amplifier for acoustic communication, and
select said fourth ADC for acoustic communication; and
wherein said acoustic communication is adapted to said upper region of said audio band; and,
wherein at least one of said ADCs and said controller is coupled to said MIMO acoustic modem.

2. A method for communicating acoustic signal, the method comprising:
  providing a communication device comprising
    a first audio circuit comprising
      a first filter coupled to a first microphone, said first filter adapted to pass signals in an audio band only,
      a second filter coupled to said first microphone, said second filter adapted to pass signals only in an upper region of said audio band,
      a first analog to digital converter (ADC) unit communicatively coupled to a MIMO acoustic modem,
      at least one of:
        a switching unit connected between an input of said first ADC unit and an output of each of said first and second filters, said switching unit configured for selecting between said outputs of said first and second filters,
        a first amplifier coupled to said first filter, and a second amplifier coupled to said second filter, wherein said second amplifier has a higher gain than said first amplifier, and
        said first analog to digital converter (ADC) unit coupled to at least one of said first filter and said first amplifier, and a second analog to digital converter (ADC) unit coupled to at least one of said second filter and said second amplifier, said second ADC being communicatively coupled to said MIMO acoustic modem, and
    a second audio circuit comprising
      a third filter coupled to a second microphone, said third filter adapted to pass signals in an audio band only,
      a fourth filter coupled to said second microphone, said fourth filter adapted to pass signals only in an upper region of said audio band,
      a third analog to digital converter (ADC) unit communicatively coupled to a MIMO acoustic modem,
      at least one of:
        a switching unit connected between an input of said third ADC unit and an output of each of said third and fourth filters, said switching unit configured for selecting between said outputs of said third and fourth filters,
        a third amplifier coupled to said third filter, and a fourth amplifier coupled to said fourth filter, wherein said fourth amplifier has a higher gain than said third amplifier, and
        said third analog to digital converter (ADC) unit coupled to at least one of said third filter and said third amplifier, and a fourth analog to digital converter (ADC) unit coupled to at least one of said fourth filter and said fourth amplifier, said fourth ADC being communicatively coupled to said MIMO acoustic modem, and
    a controller; and
  performing acoustic communication, wherein said controller selects for said acoustic communication, at least one of:
    said second and fourth filters, using said switching units,
    said second and fourth amplifier, and
    said second and fourth ADC,
  wherein said acoustic communication is adapted to said upper region of said audio band.

3. A computer program product embodied on a non-transitory computer readable medium, comprising computer code executed by a controller of a communication device, wherein said communication device comprises:
  a first audio circuit comprising
    a first filter coupled to a first microphone, said first filter adapted to pass signals in an audio band only,
    a second filter coupled to said first microphone, said second filter adapted to pass signals only in an upper region of said audio band,
    a first analog to digital converter (ADC) unit communicatively coupled to a MIMO acoustic modem,
    at least one of:
      a switching unit connected between an input of said first ADC unit and an output of each of said first and second filters, said switching unit configured for selecting between said outputs of said first and second filters,
      a first amplifier coupled to said first filter, and a second amplifier coupled to said second filter, wherein said second amplifier has a higher gain than said first amplifier, and
      said first analog to digital converter (ADC) unit coupled to at least one of said first filter and said first amplifier, and a second analog to digital converter (ADC) unit coupled to at least one of said second filter and said second amplifier, said second ADC being communicatively coupled to said MIMO acoustic modem, and
  a second audio circuit comprising
    a third filter coupled to a second microphone, said third filter adapted to pass signals in an audio band only;
    a fourth filter coupled to said second microphone, said fourth filter adapted to pass signals only in an upper region of said audio band;
    a third analog to digital converter (ADC) unit communicatively coupled to a MIMO acoustic modem;
    at least one of:
      a switching unit connected between an input of said third ADC unit and an output of each of said third and fourth filters, said switching unit configured for selecting between said outputs of said third and fourth filters;
      a third amplifier coupled to said third filter, and a fourth amplifier coupled to said fourth filter, wherein said fourth amplifier has a higher gain than said third amplifier; and
      said third analog to digital converter (ADC) unit coupled to at least one of said third filter and said third amplifier, and a fourth analog to digital converter (ADC) unit coupled to at least one of said fourth filter and said fourth amplifier, said fourth ADC being communicatively coupled to said MIMO acoustic modem; and
  wherein said computer code is adapted to perform acoustic communication, wherein said controller selects for said acoustic communication, at least one of:
    said second and fourth filters, using said switching units,
    said second and fourth amplifier, and
    said second and fourth ADC, and
  wherein said acoustic communication is adapted to said upper region of said audio band.

* * * * *